Oct. 1, 1940.　　F. CARTLIDGE　　2,216,546
ARTICULATED CONVEYER
Filed March 31, 1939　　3 Sheets-Sheet 1
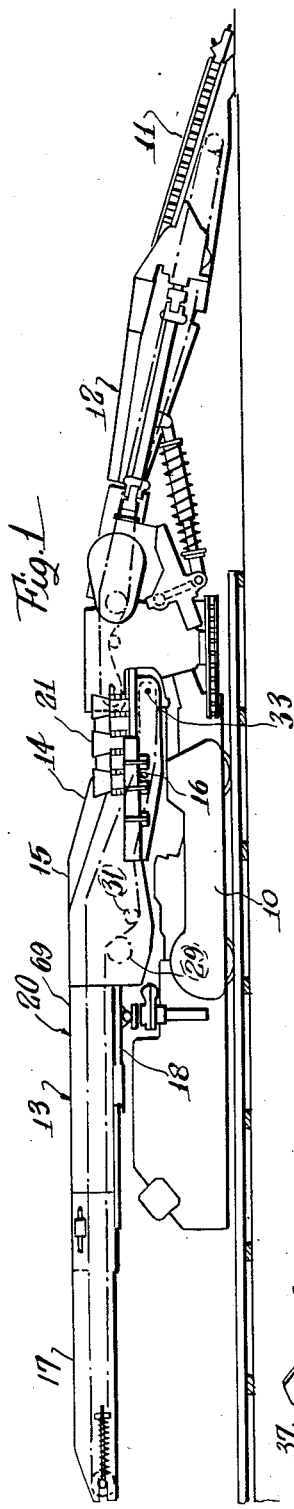
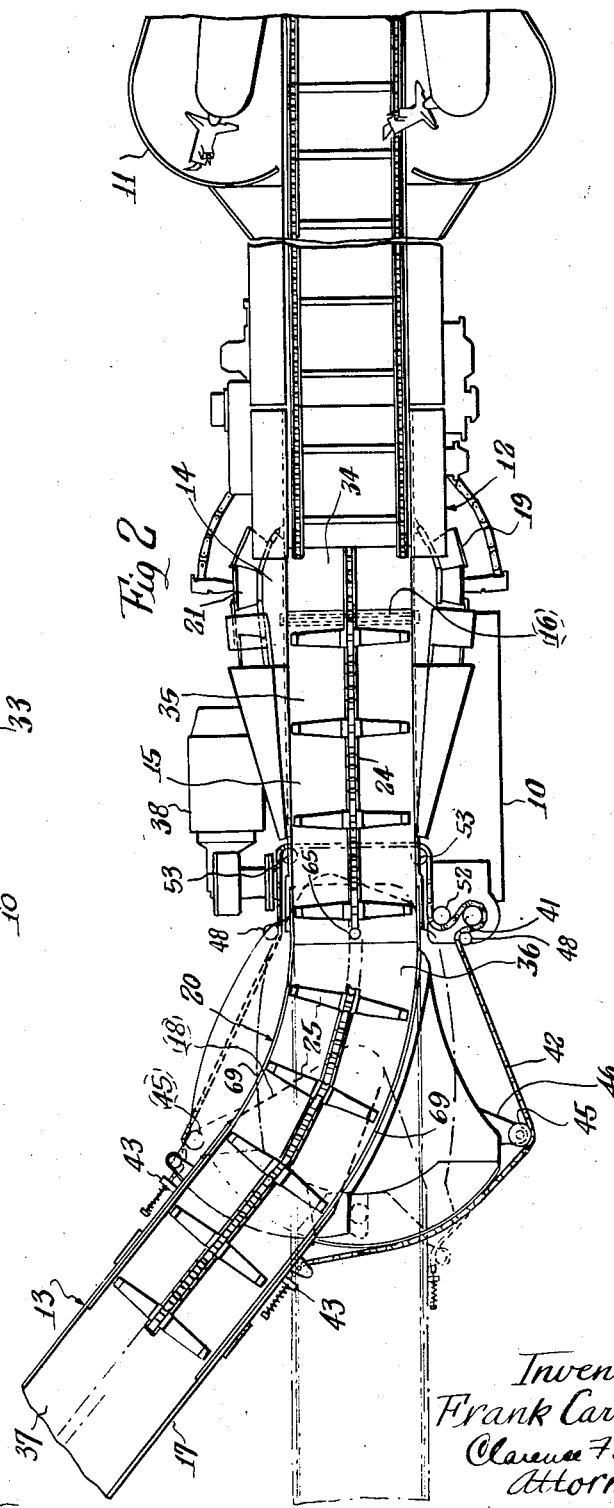
Inventor
Frank Cartlidge
Clarence F. Poole
Attorney

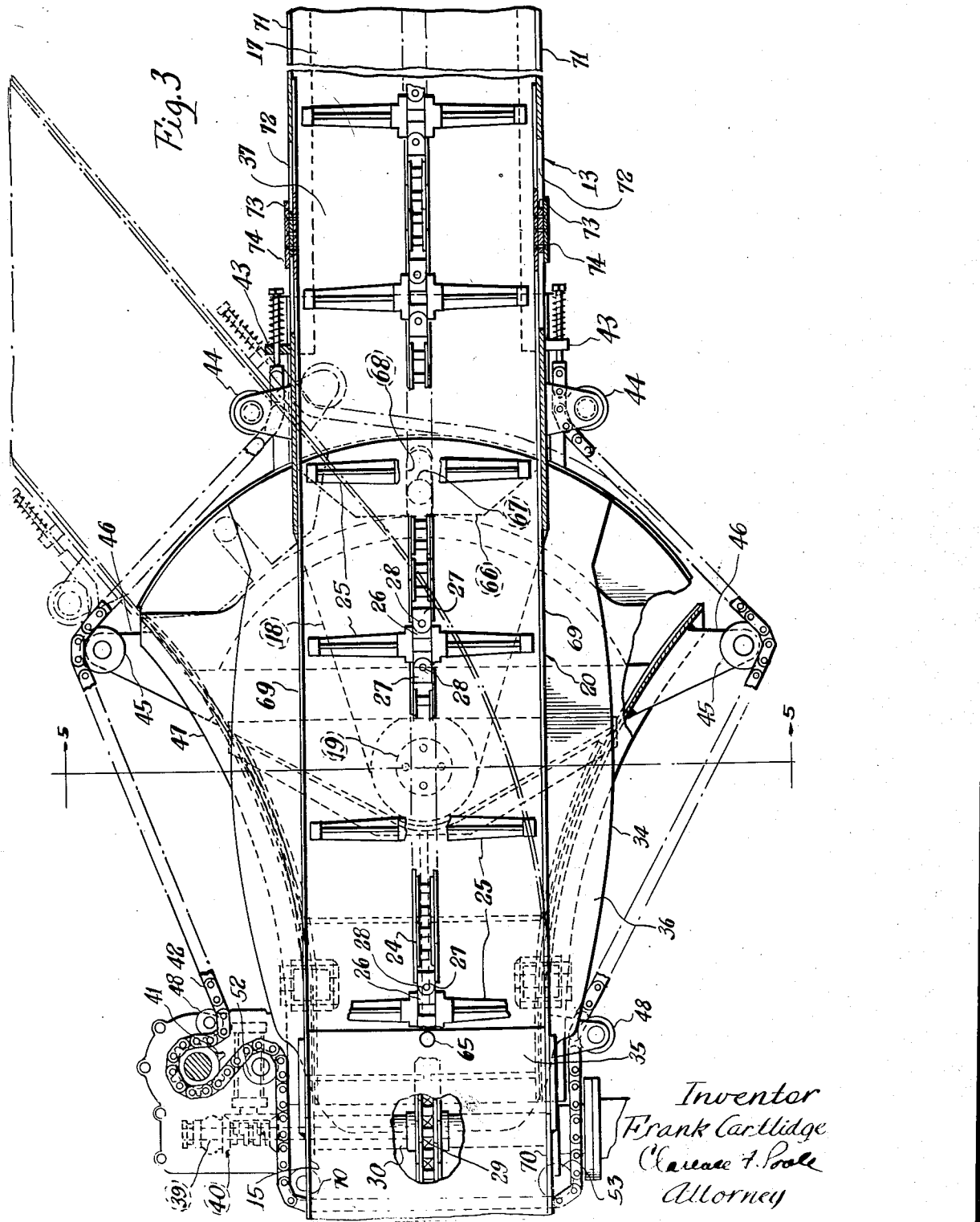

Oct. 1, 1940.  F. CARTLIDGE  2,216,546
ARTICULATED CONVEYER
Filed March 31, 1939  3 Sheets-Sheet 3

Inventor
Frank Cartlidge
Clarence F. Poole
Attorney

Patented Oct. 1, 1940

2,216,546

UNITED STATES PATENT OFFICE 2,216,546

ARTICULATED CONVEYER

Frank Cartlidge, Chicago, Ill., assignor to Goodman Manufacturing Company, Chicago, Ill., a corporation of Illinois Application March 31, 1939, Serial No. 265,102

11 Claims. (Cl. 198—109)

This invention relates to improvements in conveyers and more particularly to improvements in articulated conveyers of the center strand endless chain and flight type adapted for use with loading machines of the type operable in mines.

The principal objects of my invention are to provide a new and improved articulated conveyer of a novel and simplified form and construction including a pair of spaced apart conveyer trough sections, one of which is horizontally swingable with respect to the other, and a simple means for connecting the two trough sections together, arranged to form an unbroken trough in all positions of articulation of the conveyer, to permit the continuous movement of material from one end of the conveyer to the other when the conveyer is in various positions of articulation.

Other objects of my invention will appear from time to time as the following specification proceeds and with reference to the accompanying drawings wherein:

Figure 1 is a view in side elevation of a loading machine having a conveyer constructed in accordance with my invention embodied therein;

Figure 2 is a plan view of the loading machine shown in Figure 1, drawn to a slightly enlarged scale, with the conveyer shown in a position to discharge to one side of the track;

Figure 3 is an enlarged plan view of the conveyer, with certain parts broken away and certain other parts shown in horizontal section in order to more clearly illustrate certain details of my invention;

Figure 4:
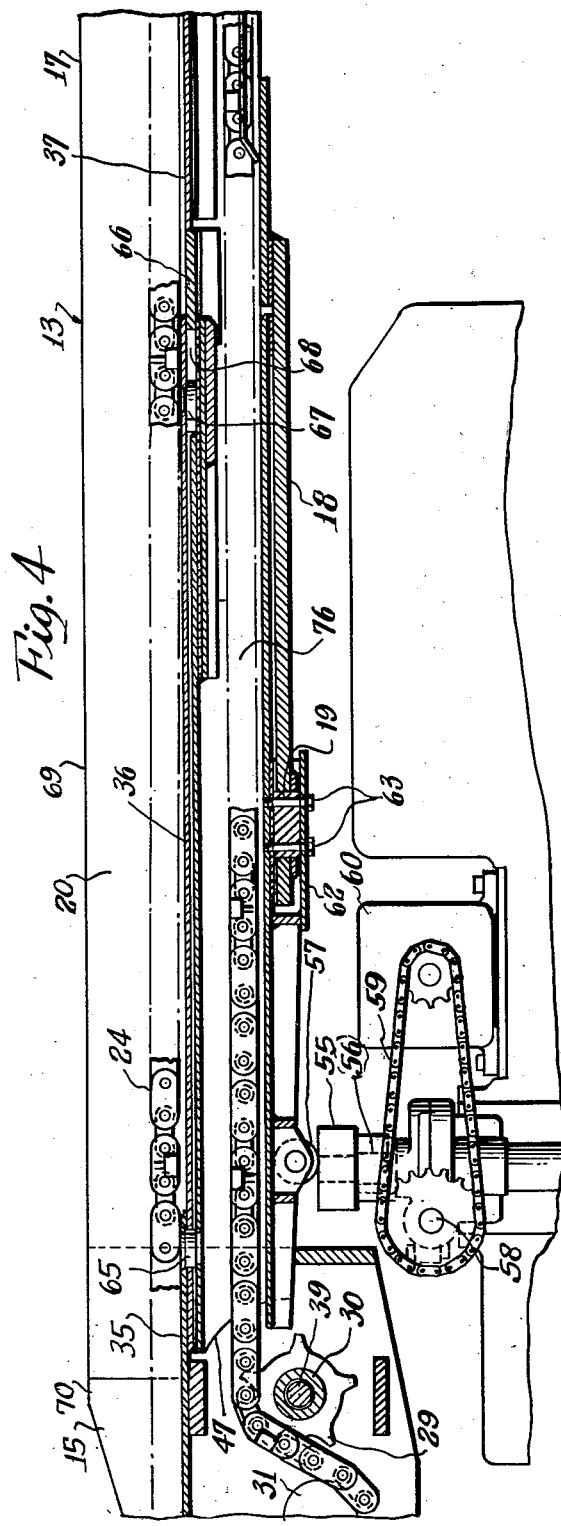
Figure 4 is a longitudinal sectional view of the conveyer drawn to a slightly larger scale than Figure 3.

In the drawings, the embodiment of my invention illustrated is herein shown in connection with a track mounted loading machine of the type particularly adapted for use in gathering and loading coal into cars in mines. Said machine is constructed along lines somewhat similar to those shown and described in a prior application Serial No. 208,969 filed by me on May 20, 1938, and now Patent No. 2,201,334, so will only herein be described in sufficient detail to make my present invention clearly understandable.

The loading machine includes generally a track mounted truck 10 having a gathering and loading element 11 projecting forwardly from the forward end thereof. Said gathering and loading element includes an inclined elevating conveyer 12 mounted on said truck for horizontal and vertical swinging movement with respect thereto, to permit the gathering of material from either side of the track, upon which the machine is mounted. Said elevating conveyer is adapted to discharge material into a discharge conveyer 13 extending longitudinally of the machine beyond the rear end thereof and having a receiving end 14 disposed beneath the discharge end of said elevating conveyer.

The receiving end 14 of the discharge conveyer 13 is herein shown as being relatively stationary. Said receiving end of said conveyer terminates into a forward trough section 15, which extends rearwardly and upwardly from said receiving end. Said forward trough section is transversely pivoted on the truck 10, on a transverse shaft 16, to permit vertical adjustment of the rear end of said discharge conveyer. A rear trough section 17 of said discharge conveyer is spaced rearwardly from said forward trough section and is provided with an inwardly extending arm 18 which forms a means for mounting said rear trough section for swinging movement in a horizontal plane about a bearing member 19, spaced to the rear of the rear end of said forward trough section and forwardly of the forward end of said rear trough section. Said forward and rear trough sections are connected together by means of an intermediate swinging connecting trough section 20.

The forward receiving portion 14 of said discharge conveyer, as herein shown, is provided with a flexible hopper 21, which is connected between the discharge end of the elevating conveyer 12 and the receiving end of said discharge conveyer, and serves to confine the material discharged from said elevating conveyer within the limits of said discharge conveyer when said conveyers are in various positions of adjustment with respect to each other. Said extensible hopper is generally shown in Figures 1 and 2 and will not herein be shown or described in detail since it is no part of my present invention and is described in detail in a companion application Serial No. 265,103, filed herewith.

The material moving or conveying element of the discharge conveyer 13 is of the continuous center strand chain and flight type and includes an endless chain 24 movable along the central portion of said discharge conveyer and having laterally projecting flights 25, 25 connected thereto at suitable intervals. As herein shown, each of said flights is mounted on a link 26 of said endless chain. Said link has links 27, 27 pivotally connected to its opposite ends by means of vertical pins 28, 28. This arrangement permits lateral swinging movement of the entire conveying element in a plane perpendicular to its plane of travel, and permits the flights 25, 25, engaging the side walls of the trough sections on their ends, to guide the chain from one trough section to the other when the conveyer is in various positions of articulation.

The endless chain 24 is trained over and driven from a drive sprocket 29 on a transverse hollow shaft 30. From thence it is trained under an idler 31 and forwardly to a suitable direction changing member (not shown), on a transverse shaft 33 at the forward end of said discharge conveyor (see Figure 1). Said endless chain extends from said direction changing member upwardly and rearwardly along a bottom plate 34 of the receiving section 14, along a bottom plate 35 of the trough section 15, a pivoted bottom plate 36 of the intermediate flexible connecting trough section 20, and along a bottom plate 37 of the rear trough section 17, to and around a suitable idler at the rear end thereof, and forwardly from said idler to and over the drive sprocket 29. The transverse shaft 30 and drive sprocket 29 are selectively driven from a motor 38, mounted on a side frame member of the forward trough section 15, in a suitable manner.

The rear trough section 17 is swung from one side of the truck to the other by means driven from the motor 38, which includes a transverse shaft 39 extending through the hollow shaft 30 and reverse gearing, generally indicated by reference character 40, and herein shown as being of an opposing bevel gear type of reverse gearing. Said reverse gearing has selective driving connection with a sprocket 41, which meshes with a chain 42, yieldably secured at its ends to lugs 43, 43, projecting from opposite sides of the rear trough section 17.

The chain 42 extends forwardly from the lugs 43, 43 around idlers 44, 44 and outwardly therefrom around the outer sides of idlers 45, 45. Said last mentioned idlers are mounted on brackets 46, 46, secured to and projecting laterally beyond the sides of a support frame 47 for the swinging portion of the conveyer. From said idlers, said chain is trained forwardly to and around the inner sides of idlers 48, 48. From thence the portion of said chain on the side of the machine, which is its left hand side when looking towards the rear end thereof, is trained around the drive sprocket 41, and around a tension idler 52. From said tension idler, said chain is trained forwardly around an idler 53 and transversely across the underside of said trough section, around another idler 53 at the opposite side of said forward trough section, and rearwardly therefrom to and around the inside of the idler 48, on the side of the machine opposite from the drive sprocket 41. The application of power to the sprocket 41 will thus cause swinging movement of said rear trough section in an obvious manner.

A suitable means is provided to vertically adjust the rear end of the discharge conveyer 13 about the axis of the transverse shaft 16, which, as herein shown, includes a pair of laterally spaced members 55, 55. Said members are engaged by and form a support for spaced apart rollers 57, 57 mounted on the frame 47 and depending therefrom. Each of said members is mounted on the upper end of a threaded shaft 56. Said shafts are disposed on opposite sides of the truck frame and may be threaded within suitable threaded nuts (not shown) which may be rotatably driven in one direction or another to elevate or lower said shafts. The means for rotatably driving said nuts may be a suitable gear train (not shown), which may be driven from a transverse shaft 58, and a chain and sprocket drive 59, driven from a motor 60 mounted on the truck frame (see Figure 4).

Referring now in particular to the details of construction of the intermediate flexible trough section 20 and several of the novel features of my invention, the support frame 47 is herein shown as being a rearward extension of the frame for the forward trough section 15. Said support frame is of a boxlike construction forming a support for the pivoted bottom plate 36 and having a widened arcuate formed fan-shaped rear end along which the rear trough section 17 may swing. The arm 18 extends forwardly from said rear trough section and is journaled at its forward end on the bearing member 19, as has hereinbefore been mentioned. Said bearing member is secured to the underside of said support frame by means of a bracket 62 and suitable machine screws 63, 63, extending through said bracket and bearing member and threaded in the bottom of the frame 47 (see Figure 4).

The movable bottom plate 36 is slidably mounted on the supporting frame 47 for movement thereacross, upon horizontal swinging movement of the rear trough section 17 and, as herein shown, underlaps the rear end of the bottom plate 35 of the forward trough section 15, which trough section terminates forwardly of the bearing member 19. A vertical stud 65 is connected between the top surface of the supporting frame 47 and the underside of the bottom plate 35 and forms a pivotal mounting for the forward end of the movable bottom plate 36. The rear end of said movable bottom plate overlaps a plate 66, which is secured to and extends forwardly from the forward end of the bottom plate 37 of the rear trough section 17, and which is spaced rearwardly of the bearing member 19. A stud 67, secured to and depending from the rear end of said movable bottom plate is slidably mounted in a slot 68 formed in the plate 66 (see Figure 4), to permit said plate to follow said rear trough section upon swinging movement thereof about an axis spaced rearwardly of the axis of swinging movement of said plate.

The side walls of the forward and rear trough sections are connected together by means of a pair of parallel spaced flexible side walls 69, 69, slidably engaging the top surface of the plate 36 and herein shown as being secured at their forward ends to the rear ends of side walls 70, 70 of the forward trough section 15. The rear ends of said flexible side walls are slidably connected with side walls 71, 71 of the rear trough section 17. As herein shown, said last mentioned side walls are each provided with a longitudinally extending slot 72. Each of said slots forms a guide for a member 73, which is secured to and projects laterally from the outer side of the flexible side wall 69. A retaining plate 74 is secured to the outer side of the member 73 and to the flexible side wall 69 by means of the same fastening means which secures said member 73 to said side wall. Said retaining plate extends beyond the vertical limits of said slot and slidably engages the outer side of the side wall 71, and thus serves to hold the flexible side wall 69 in close slidable engagement with the side wall 71 (see Figure 3).

The movable bottom plate 36 is widened forwardly of the forward end of the forward trough section 15 to provide a surface of sufficient width to form a bottom for the conveyer in all positions of swinging movement of the trough section 17, so said bottom plate may bridge the gap between the forward trough section 15 and rear trough section 17 and, together with the flexible side walls 69, 69, form a continuous trough between said forward and rear trough sections in all positions of articulation of the conveyer.

Figure 5:
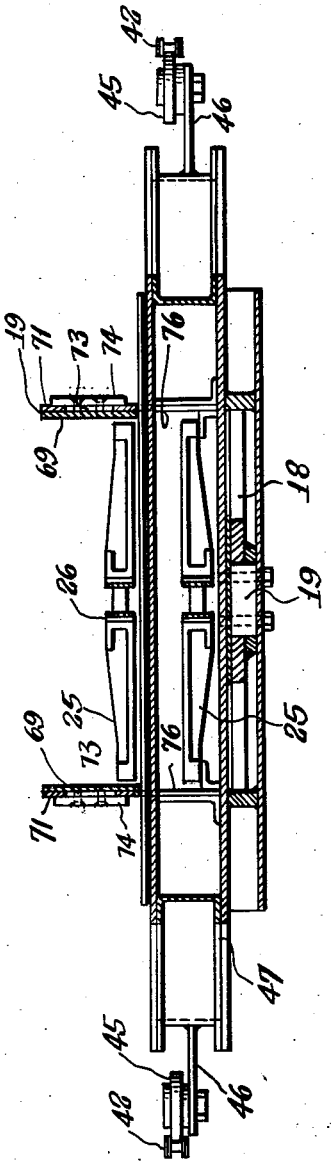
Figure 5 is a transverse sectional view taken substantially along line 5—5 of Figure 3.

The endless chain 24, on its return path, passes between the top and bottom portions of the supporting frame 47. Flexible side walls 76, 76 are mounted in the hollow portion of said supporting frame. Said side walls are fixed to the frame of one of said trough sections, and are slidably connected to the frame of said other trough section to form a trough shaped guide for the ends of the flights 25, 25 and the return run of the endless chain 24, to guide said chain from one trough section to the other when the conveyer is in various positions of articulation (see Figure 5). Said side walls are of a form similar to the flexible side walls 69, 69 and are mounted in the frames for the forward and rear trough sections in a manner similar to which the flexible side walls 69, 69 are connected to the side walls 70, 70 and 71, 71.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In an articulated conveyer, a pair of spaced apart trough sections, one of which is horizontally swingable with respect to the other about a fixed pivotal axis spaced from said other trough section, a widened support, and a plate slidably mounted on said support and forming a bottom connecting said trough sections together, said plate having pivotal connection with one of said trough sections on one side of said fixed pivotal axis and slidable and pivotal connection with said other trough section on the opposite side of said pivotal axis.

2. In an articulated conveyer, a pair of spaced apart trough sections, one of which is horizontally swingable with respect to the other about a fixed pivotal axis spaced from said other trough section, a widened support, and a plate slibably mounted on said support and forming a bottom connecting said trough sections together, said swingable trough section having an entering end spaced rearwardly of its axis of swinging movement, and said other trough section terminating at a point forwardly of the pivotal axis of said swinging trough section, a pivotal connection between the forward end of said plate and the rear end of said last named trough section, and a pivotal and slidable connection between the rear end of said plate and the forward end of said swinging trough section, to permit swinging movement of said plate with said rear trough section about an axis spaced from the axis of swinging movement of said rear trough section.

3. In an articulated conveyer, a pair of spaced apart trough sections, one of which is horizontally swingable with respect to the other about an axis spaced from said other trough section, a widened support, and a plate slidably mounted on said support and forming a bottom connecting said trough sections together, said swingable trough section having an entering end spaced rearwardly of its axis of swinging movement and being overlapped by the rear end of said plate, said other trough section terminating at a point spaced forwardly of the pivotal axis of said swinging trough section and overlapping the forward end of said plate, a pivotal connection between one end of said plate and one of said trough sections and a pin and slot connection between the opposite end of said plate and the adjacent end of said other trough section to permit swinging movement of said plate with said swingable trough section about an axis spaced from the axis of swinging movement of said swingable trough section.

4. In an articulated conveyer, a pair of spaced apart trough sections, one of which is horizontally swingable with respect to the other about a fixed pivotal axis spaced from said other trough section, each of said trough sections including a bottom and a pair of spaced apart upright side walls, an endless conveyer movable along said trough sections, flexible side walls connecting the side walls of said trough sections together, and means bridging the gap between said trough sections to permit the continuous movement of material from one end of one trough section to the opposite end of the other including a plate pivotally connected to one of said trough sections and having pivotal and slidable connection with said other trough section, the points of connection of said plate to said trough sections being on opposite sides of the axis of swinging movement of said swingable trough section.

5. In an articulated conveyer, a pair of spaced apart trough sections, one of which is horizontally swingable with respect to the other about an axis spaced from said other trough section, each of said trough sections including a bottom and a pair of spaced apart upright side walls, an endless conveyer movable along said trough sections, flexible side walls connecting the side walls of said trough sections together, a swinging bottom plate connected between said trough sections and with said side walls forming a trough connecting said trough sections together, said bottom plate extending beneath said forward trough section and having pivotal connection therewith at a point spaced forwardly of the axis of swinging movement of said movable trough section, and overlapping said movable trough section and having pivotal and slidable connection therewith at a point spaced rearwardly of the axis of swinging movement of said movable trough section.

6. In an articulated conveyer, a pair of spaced apart trough sections, one of which is horizontally swingable with respect to the other about an axis spaced from said other trough section, each of said trough sections including a bottom and a pair of spaced apart upright side walls, an endless conveyer movable along said trough sections, flexible side walls connecting the side walls of said trough sections together, a swinging bottom plate connected between said trough sections and with said side walls forming a trough connecting said trough sections together, a pin connecting said bottom plate with one of said trough sections at a point spaced from the axis of swinging movement of said swinging trough section, and a pin and slot connection between the opposite end of said plate and said other trough section to permit said plate to follow said rear trough section upon swinging movement thereof.

7. In an articulated conveyer, a fixed trough section, a widened support projecting rearwardly from said fixed trough section, a movable trough section pivotally mounted on said support for horizontal swinging movement about a fixed axis spaced from the end of said fixed trough section, and means connecting said trough sections together to form a continuous trough from one end of one trough section to the opposite end of the other including a pair of flexible side walls connecting said trough sections together and a bottom plate slidably mounted on said widened support and having pivotal connection with said stationary trough section adjacent the rear end thereof and on one side of said fixed axis and slidable and pivotal connection with an adjacent end of said movable trough section on the other side of said fixed axis, said plate being widened to form a bottom beneath said flexible side walls in all positions of articulation of the conveyer.

8. In an articlated conveyer, a fixed trough section, a movable trough section, an endless conveyer movable along said trough sections from one end of one trough section to the opposite end of the other, a support extending rearwardly from said fixed trough section, an arm extending inwardly from said movable trough section beneath said support, a rocking connection between the inner end of said arm and said support at a point spaced rearwardly from the end of said fixed trough section, and means connecting said trough sections together to form a continuous trough from one end of one trough section to the opposite end of the other including a pair of flexible side walls and a bottom plate slidably mounted on said support beneath said flexible side walls, said bottom plate having pivotal connection with one of said trough sections and slidable and pivotal connection with the other of said trough sections and with said flexible side walls forming a trough bridging the gap between said trough sections.

9. In an articulated conveyer, a fixed trough section, a movable trough section, an endless conveyer movable along said trough sections from one end of one trough section to the opposite end of the other, a support extending rearwardly from said fixed trough section, an arm extending inwardly from said movable trough section beneath said support, a rocking connection between the inner end of said arm and said support at a point spaced rearwardly from the end of said fixed trough section, and means connecting said trough sections together to form a continuous trough from one end of one trough section to the opposite end of the other including a pair of flexible side walls and a bottom plate slidably mounted on said support beneath said flexible side walls, said plate being widened to form a bottom between said side walls in all positions of articulation of the conveyer and with said flexible side walls forming a trough bridging the gap between said trough sections, a pivotal connection between said plate and one of said trough sections at a point spaced from the rocking connection of said arm, and a slidable and pivotal connection between said plate and said other trough section at a point spaced from the rocking connection of said arm.

10. In an articlated conveyer, a fixed trough section, a movable trough section, an endless conveyer movable along said trough sections from one end of one trough section to the opposite end of the other, a support extending rearwardly from said fixed trough section, an arm extending inwardly from said movable trough section beneath said support, a pivotal connection between the inner end of said arm and said support at a point spaced rearwardly from the end of said fixed trough section, and means connecting said trough sections together to form a continuous trough from one end of one trough section to the opposite end of the other including a pair of flexible side walls and a bottom plate slidably mounted on said support beneath said flexible side walls, said plate being widened intermediate its ends to form a bottom between said side walls in all positions of articulation of the conveyer and with said flexible side walls forming a trough bridging the gap between said trough sections, a pivotal pin depending from said forward trough section, adjacent the rear end thereof and forming a means for pivotally connecting the forward end of said plate with said forward trough section, a slot extending along the bottom of the forward end of said rear trough section, and a pin depending from the rear end of said plate and having slidable connection with said slot.

11. In an articlated conveyer, a fixed trough section, a movable trough section, an endless conveyer movable along said trough sections from one end of one trough section to the opposite end of the other, a support extending rearwardly from said fixed trough section, an arm extending inwardly from said movable trough section beneath said support, a pivotal connection between the inner end of said arm and said support at a point spaced rearwardly from the end of said fixed trough section, and means connecting said trough sections together to form a continuous trough from one end of one trough section to the opposite end of the other including a pair of flexible side walls and a bottom plate slidably mounted on said support beneath said flexible side walls and with said flexible side walls forming a trough bridging the gap between said trough sections, said forward trough section terminating forwardly of the pivotal axis of said arm and overlapping the forward end of said swinging bottom plate, a pin pivotally connecting said bottom plate to said forward trough section, the forward end of said rear trough section being disposed rearwardly from the pivotal axis of said arm, said plate overlapping the forward end of said rear trough section, and a pin and slot connection between said plate and rear trough section, to permit swinging movement of said plate and rear trough section about spaced apart vertical axes.

FRANK CARTLIDGE.